(12) United States Patent
Singh et al.

(10) Patent No.: US 11,721,447 B2
(45) Date of Patent: Aug. 8, 2023

(54) IMPACT AMELIORATION SYSTEM FOR NUCLEAR FUEL STORAGE

(71) Applicant: Holtec International, Camden, NJ (US)

(72) Inventors: Krishna P. Singh, Jupiter, FL (US); John D. Griffiths, Deptford, NJ (US)

(73) Assignee: HOLTEC INTERNATIONAL

( * ) Notice: Subject to any disclaimer, the term of this patent is extended or adjusted under 35 U.S.C. 154(b) by 226 days.

(21) Appl. No.: 17/132,102

(22) Filed: Dec. 23, 2020

(65) Prior Publication Data

US 2021/0225541 A1 Jul. 22, 2021

Related U.S. Application Data

(60) Provisional application No. 62/954,083, filed on Dec. 27, 2019.

(51) Int. Cl.
*G21F 5/08* (2006.01)
*G21F 5/008* (2006.01)

(52) U.S. Cl.
CPC ............... *G21F 5/08* (2013.01); *G21F 5/008* (2013.01)

(58) Field of Classification Search
CPC ... G21F 5/008; G21F 5/06; G21F 5/08; G21C 9/04; B65D 2213/00; B65D 2590/22; F16F 7/003; F16F 7/12; F16F 7/125; E04H 9/0215; E04H 9/0237
USPC .............................. 376/272; 250/506.1–507.1
See application file for complete search history.

(56) References Cited

U.S. PATENT DOCUMENTS

| 3,741,349 | A | * | 6/1973 | Banks ................... G21C 19/02 188/42 |
| 4,336,460 | A | | 6/1982 | Best et al. |
| 5,394,449 | A | | 2/1995 | Johnson et al. |
| 6,234,311 | B1 | * | 5/2001 | Francois ................. G21F 5/08 206/521 |
| 10,410,756 | B2 | | 9/2019 | Singh |
| 11,081,249 | B2 | | 8/2021 | Singh et al. |

(Continued)

FOREIGN PATENT DOCUMENTS

FR 1500850 11/1967

OTHER PUBLICATIONS

International Search Report and Written Opinion for International Application PCT/US2020/066764 dated Jun. 3, 2021.

*Primary Examiner* — Jack W Keith
*Assistant Examiner* — Jinney Kil
(74) *Attorney, Agent, or Firm* — The Belles Group, P.C.

(57) ABSTRACT

An impact amelioration system for nuclear fuel storage components in one embodiment includes a fuel storage canister and outer cask receiving the canister. The canister is configured for storing spent nuclear fuel or other high level radioactive waste. A plurality of impact limiter assemblies are disposed on the bottom closure plate of the cask at the canister interface. Each impact limiter assembly comprises an impact limiter plug frictionally engaged with a corresponding plug hole formed in the cask closure plate. The canister rests on tops of the plugs, which may protrude upwards beyond the top surface of the bottom closure lid. The plugs and holes may mating tapered and frictionally engaged surfaces. During a cask drop event, the canister drives the plugs deeper into the plug holes and elastoplastically deform to dissipate the kinetic impact energy and protect the structural integrity of the canister and its contents.

16 Claims, 13 Drawing Sheets

(56) References Cited

U.S. PATENT DOCUMENTS

| | | | |
|---|---|---|---|
| 2006/0006351 A1* | 1/2006 | Timpert | G21F 5/005 |
| | | | 250/506.1 |
| 2010/0177858 A1 | 7/2010 | Kielbowicz | |
| 2012/0187616 A1* | 7/2012 | Friedrich | F16F 7/125 |
| | | | 188/374 |
| 2014/0329455 A1* | 11/2014 | Singh | G21F 5/10 |
| | | | 53/473 |
| 2015/0092903 A1 | 4/2015 | Tuite et al. | |
| 2015/0187447 A1* | 7/2015 | Liszkai | G21D 1/00 |
| | | | 376/277 |
| 2015/0213910 A1 | 7/2015 | Allan | |
| 2015/0310947 A1 | 10/2015 | Singh | |
| 2016/0125966 A1* | 5/2016 | De Gasquet | G21F 5/008 |
| | | | 250/506.1 |
| 2016/0348751 A1* | 12/2016 | Cho | E04B 1/98 |
| 2018/0005718 A1* | 1/2018 | Singh | G21F 5/06 |
| 2021/0225541 A1 | 7/2021 | Singh et al. | |
| 2021/0257119 A1 | 8/2021 | Singh | |
| 2021/0272714 A1 | 9/2021 | Singh | |

* cited by examiner

IMPACT AMELIORATION SYSTEM FOR NUCLEAR FUEL STORAGE

CROSS-REFERENCE TO RELATED APPLICATIONS

This application claims the benefit of U.S. Provisional Application No. 62/954,083 filed Dec. 27, 2019, which is incorporated herein by reference in its entirety.

BACKGROUND

The present invention relates generally to systems and vessels for storing high level radioactive waste such as used or spent nuclear fuel (SNF), and more particularly to an improved system which ameliorates the effects of a forceful impact on such nuclear fuel storage vessels and concomitantly the SNF assemblies stored therein.

In the operation of nuclear reactors, the nuclear energy source is in the form of hollow Zircaloy tubes filled with enriched uranium, collectively arranged in multiple assemblages referred to as fuel assemblies. When the energy in the fuel assembly has been depleted to a certain predetermined level, the used or "spent" nuclear fuel (SNF) assemblies are removed from the nuclear reactor. The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly that comprises a plurality of individual spent nuclear fuel rods. The fuel basket is arranged inside a cylindrical metallic fuel storage canister, which is often referred to as a multi-purpose canister (MPC) that forms the primary nuclear waste containment barrier. Such MPCs are available from Holtec International of Camden, N.J. The fuel assemblies are typically loaded into the canister while submerged in the spent fuel pool of the reactor containment structure to minimize radiation exposure to personnel.

The fuel canister loaded with SNF (or other high level radioactive waste) is then placed into an outer overpack or cask, which forms the secondary containment, for safe transport and storage of the multiple spent fuel assemblies. Casks are heavy radiation shielded containers used to store and/or transfer the SNF canister from the spent fuel pool ("transfer cask") in the nuclear reactor containment structure to a more remote staging area for interim term storage such as in the dry cask storage system of an on-site or off-site independent spent fuel storage installation (ISFSI) until a final repository for spent nuclear fuel is available from the federal government.

Drop events involving heavy loads such as nuclear waste fuel casks are among the more serious accidents in industry. In the nuclear industry, an accidental drop of a cask onto a stationary reinforced concrete surface is a typical postulated scenario involving a hard and heavy object slamming onto a highly inflexible surface. Classical dynamics teaches us that the deceleration g-load under such an impact scenario is roughly proportional to the square root of the stiffness of the impacting interface. The more rigid the impactor and the stationary target, the higher is the g-load. Reducing the g-load is essential to minimize the physical damage to the colliding bodies; which is critically important if one of the two bodies contains a hazardous radioactive material such as spent nuclear fuel.

Accordingly, there remains a need for improvements in controlling and reducing the g-load associated with impacts occurring with the foregoing nuclear waste storage systems.

BRIEF SUMMARY

The present application discloses an impact amelioration or limiting system usable in nuclear waste fuel storage vessels. The system operates to ameliorate and reduce the g-load or force (gravitational) imparted to such vessels due to mutual impact between the vessels resulting from a drop event. The proposed impact limiting system design can comprise installing one or preferably more tapered impact limiter rods or plugs in closely fitting and frictionally engaged tapered plug holes formed in one of the two mutually impacting vessels. The combination tapered plug and corresponding hole collectively defines an impact limiter assembly. In one embodiment, the impacting vessels may be without limitation an outer nuclear waste transfer overpack or cask and a SNF storage canister (aka fuel canister) such as a MPC described above. The impact limiter rods or plugs and corresponding tapered plug holes may be arranged on the cask in one configuration at the interface between the bottom of the canister and bottom closure plate of the cask. The impact amelioration system is designed to absorb and dissipate at least a portion of the kinetic energy imparted to the vessels during a cask drop event, as further described herein.

The impact limiter plugs are partially embedded in their respective plug holes. Under impact during a generally vertical drop scenario, each tapered impact limiter plug that may be provided when acted upon by the canister will advance a distance deeper inside its respective tapered hole in the cask. The impact force of the plug's kinetic energy is absorbed by the combined action of interfacial friction (between engaged side surfaces of the plug and hole walls) and the elastic-plastic (elastoplastic) deformation and expansion of the plugs within the tapered holes. Accordingly, the partially embedded plugs which protrude above top surface of the bottom closure plate of the cask are driven deeper into the plug holes by the impact force. Calculations show that a suitable choice of the principal parameters such as the material of the tapered rod, angle of taper, rod diameter, and number of impact limiter rods or plugs provided results in reducing the peak g-load resulting from the impact significantly. Advantageously, this protects and minimizes or prevents the spent nuclear fuel (SNF) assemblies stored within the fuel canister from damage during the impact scenario.

A plurality of impact limiter rod or plugs and corresponding tapered plug holes may be arrayed around and partially embedded in the top surface of the bottom closure plate of the cask. The plugs protrude upwards beyond the top surface towards the canister in a pattern selected to provide impact protection in a uniform manner at the bottom or lower cask to canister interface. The canister is seated on the top surfaces of the plugs which act as pedestals that support the canister in a spaced apart manner from the cask bottom closure plate. The canister therefore does not directly contact the bottom closure plate of the cask. All quadrants of the cask bottom closure plate may include at least one impact limiter assembly (i.e. tapered plug and hole), but preferably multiple impact limiter assemblies. This ensures even distribution of the impact forces in the event of a generally straight vertical drop and/or guarantees that an off-center drop at an angle will result in at least some impact limiter assemblies being positioned to absorb the resultant impact forces and decelerate the canister to reduce peak g-loads.

An impact amelioration system for nuclear fuel storage components in one embodiment comprises: a fuel storage canister comprising a first shell extending along a vertical centerline, the canister configured for storing nuclear fuel; an outer cask defining a cavity receiving the canister, the cask comprising a second shell and a bottom closure plate attached to the second shell; a plurality of impact limiter assemblies disposed on the bottom closure plate at a canister to cask interface, each of the impact limiter assemblies comprising a plug frictionally engaged with a corresponding plug hole formed in the bottom closure plate; wherein the plugs engage the canister.

A method for ameliorating impact between components of a fuel storage system in one embodiment comprises: partially embedding a plurality of impact limiter plugs in corresponding plug holes formed in a bottom closure plate of a cask; seating the canister on the plugs, the plugs being positioned at a first depth in the plug holes; impacting the canister against the plugs with an impact force; and driving the plugs to a second depth in the plug holes deeper than the first depth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
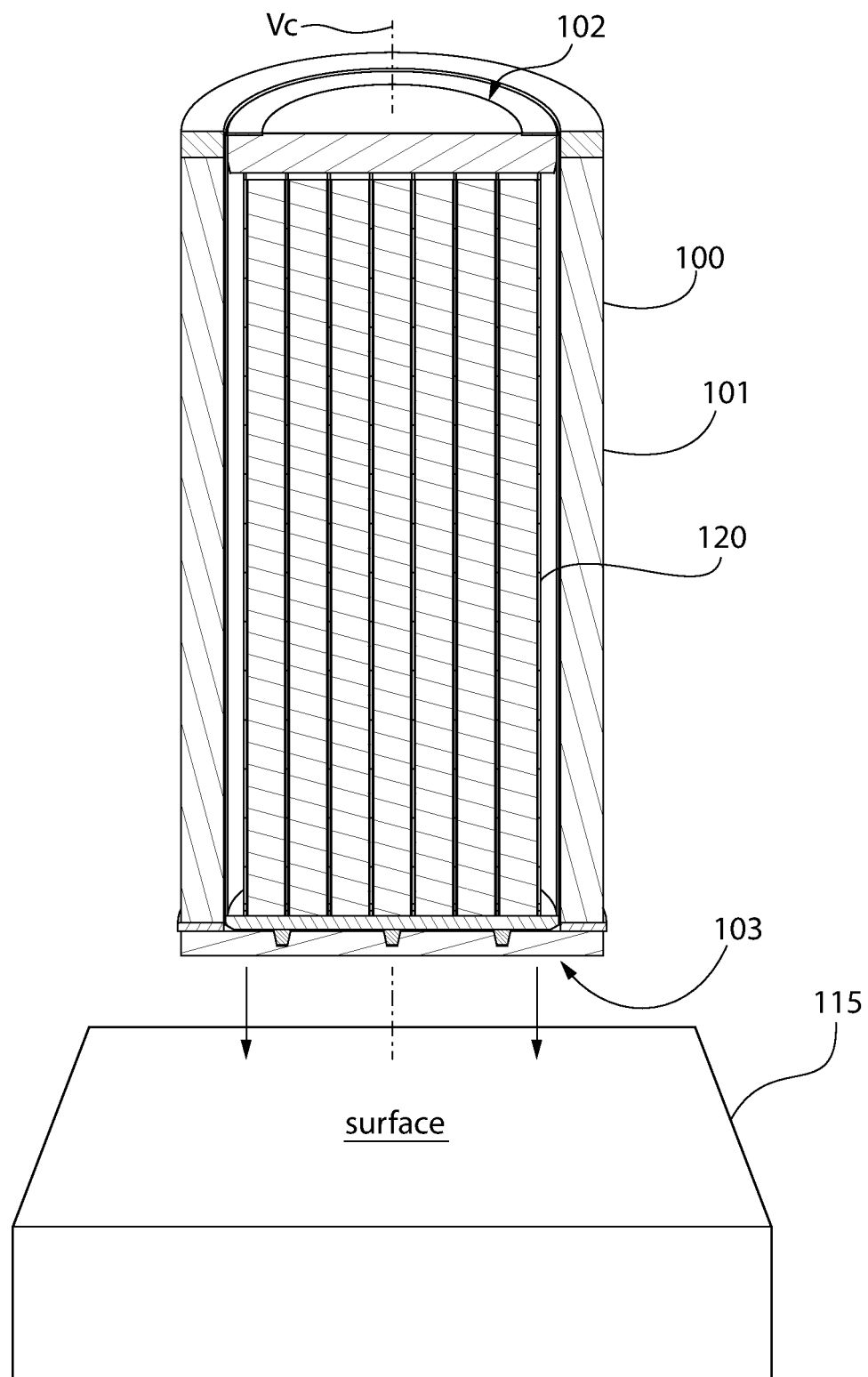
FIG. 1 is a front cross-sectional perspective view of an impact amelioration system for nuclear fuel storage according to the present disclosure including a transfer cask and fuel canister.

All drawings are schematic and not necessarily to scale. Features shown numbered in certain figures which may appear un-numbered in other figures are the same features unless noted otherwise herein. A general reference herein to a figure by a whole number which includes related figures sharing the same whole number but with different alphabetical suffixes shall be construed as a reference to all of those figures unless expressly noted otherwise.

DETAILED DESCRIPTION

The features and benefits of the invention are illustrated and described herein by reference to non-limiting exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, any references cited herein are hereby incorporated by reference in their entireties. In the event of a conflict in a definition in the present disclosure and that of a cited reference, the present disclosure controls.

The terms "seal weld or welding" if used herein shall be construed according to its conventional meaning in the art to be a continuous weld which forms a gas-tight hermetically sealed joint between the parts joined by the weld.

FIGS. 1-13 depicts various aspects of an impact amelioration or limiter system associated with nuclear waste storage systems comprising vessels used in the storage of spent nuclear fuel (SNF) or other irradiated high level radioactive waste materials removed from the nuclear reactor containment. The amelioration system generally comprises an outer transfer overpack or cask 100 and a waste fuel (e.g. SNF) canister 120 configured for storage inside the cask. Features of each storage vessel and the impact amelioration system will now be further described.

Canister 120 may be used for storing any type of high level radioactive nuclear waste, including without limitation spent nuclear fuel (SNF) or other forms of radioactive waste materials removed from the reactor. The SNF or simply fuel canister for short may be any commercially-available nuclear fuel/waste storage canister, such as a multi-purpose canister (MPC) available from Holtec International of Camden, N.J. or other.

Canister 120 has a vertically elongated and metallic body comprised of a cylindrical shell 121 extending along a vertical centerline Vc which passes through the geometric center of the shell. Canister 120 includes a bottom baseplate 122 seal welded to a bottom end of the shell, and an open top 126 which may be closed by an attached lid 125 (schematically shown in dashed lines in FIG. 3 to avoid obscuring other aspects of the image). Lid 125 may be seal welded to a top end 126 of the canister shell 121 to form a hermetically sealed cavity 127 inside the canister. The foregoing canister parts may be formed of any suitable metal, such as for example without limitation steel including stainless steel for corrosion protection.

Fuel basket 123 is disposed in cavity 127 of the canister 120 and is seated on the bottom baseplate 122 as shown. The fuel basket may be welded to the baseplate for stability in some embodiments. In some embodiments, the baseplate 122 may extend laterally outwards beyond the sides of the fuel basket 123 around the entire perimeter of the fuel basket as shown.

Figure 14:
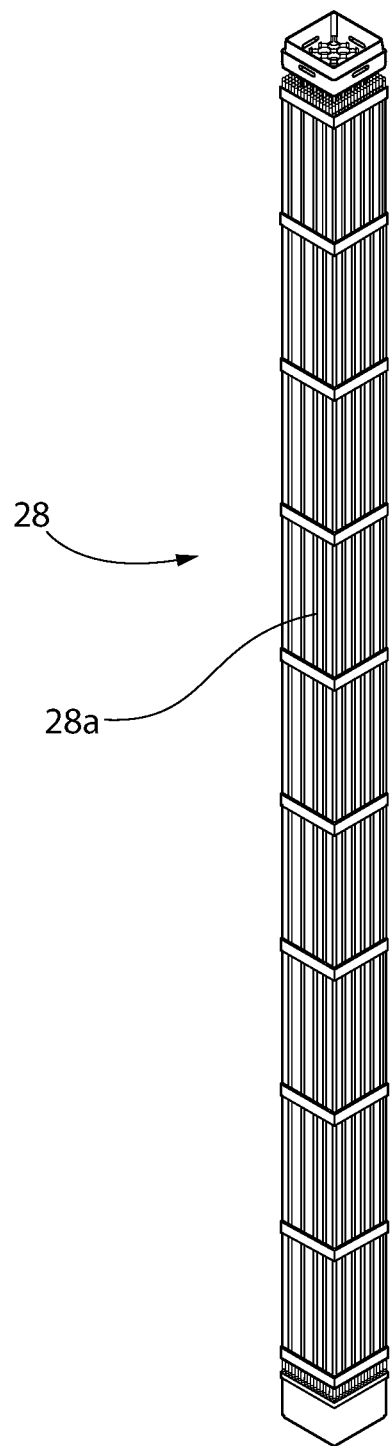
FIG. 14 is a perspective view of an exemplary nuclear fuel assembly of the type which may be stored in the canister.

The fuel basket 123 is a honeycomb prismatic structure which in one embodiment may be formed by a plurality of interlocked and orthogonally arranged slotted plates 123a built up to a selected height in vertically stacked tiers. The plates of fuel basket 123 define a grid array of plural vertically-extending openings forming fuel assembly storage cells 124. Each cell is configured in cross-sectional area and shape to hold a single U.S. style fuel assembly 28, which contains multitude of spent nuclear fuel rods 28a (or other nuclear waste). An exemplary fuel assembly of this type having a conventional rectilinear cross-sectional configuration is shown in FIG. 14. Such fuel assemblies and the foregoing fuel basket structure are well known in the industry. The open cells 124 of the fuel basket are defined by the orthogonally intersecting slotted plates 210, and therefore have a concomitantly rectilinear cross-sectional shape (e.g. square). This gives the fuel basket an overall compound rectilinear polygonal shape in transverse cross section as shown which includes multi-faceted and stepped exterior peripheral side surfaces collectively defined by the flat lateral peripheral sidewalls of the outermost exterior slotted plates 123a.

Transfer cask 100 has a vertically elongated metallic body including a cylindrical shell 101, circular top closure plate 102 attached to the top end of the shell, and a circular bottom closure plate 103 attached to the bottom end of the shell. A top ring plate 107 may be provided which is fixedly attached to the top end of shell 101 such as via welding. A bottom ring plate 106 may be fixedly attached (e.g. seal welded) to the upper or top surface 105 of the bottom closure plate 103 at its periphery; which ring plate in turn is fixedly attached (e.g. seal welded) to the bottom end of the shell 101. The top closure plate 102 may also be seal welded to the shell 101, or in some embodiments may instead be bolted and gasketed to the cask instead to provide easier access to the canister 120. An internal cavity 104 is defined by the cask which extends for a full height of the cask. The cavity 104 is configured in dimension and transverse cross-sectional area to hold only a single fuel canister 120 in some embodiments as is conventional practice in the art.

Figure 2:
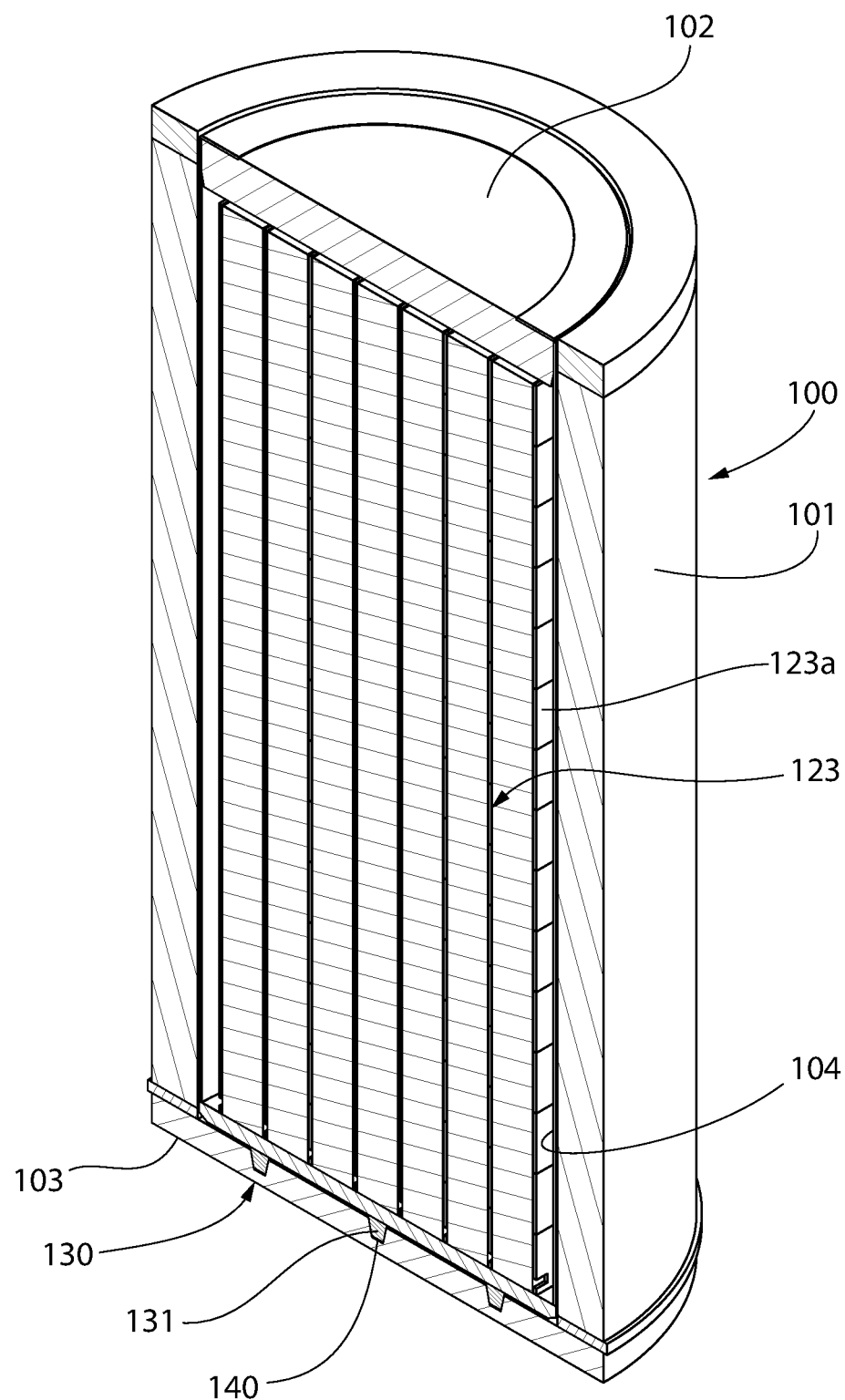
FIG. 2 is a side cross sectional view thereof.
Figure 3:
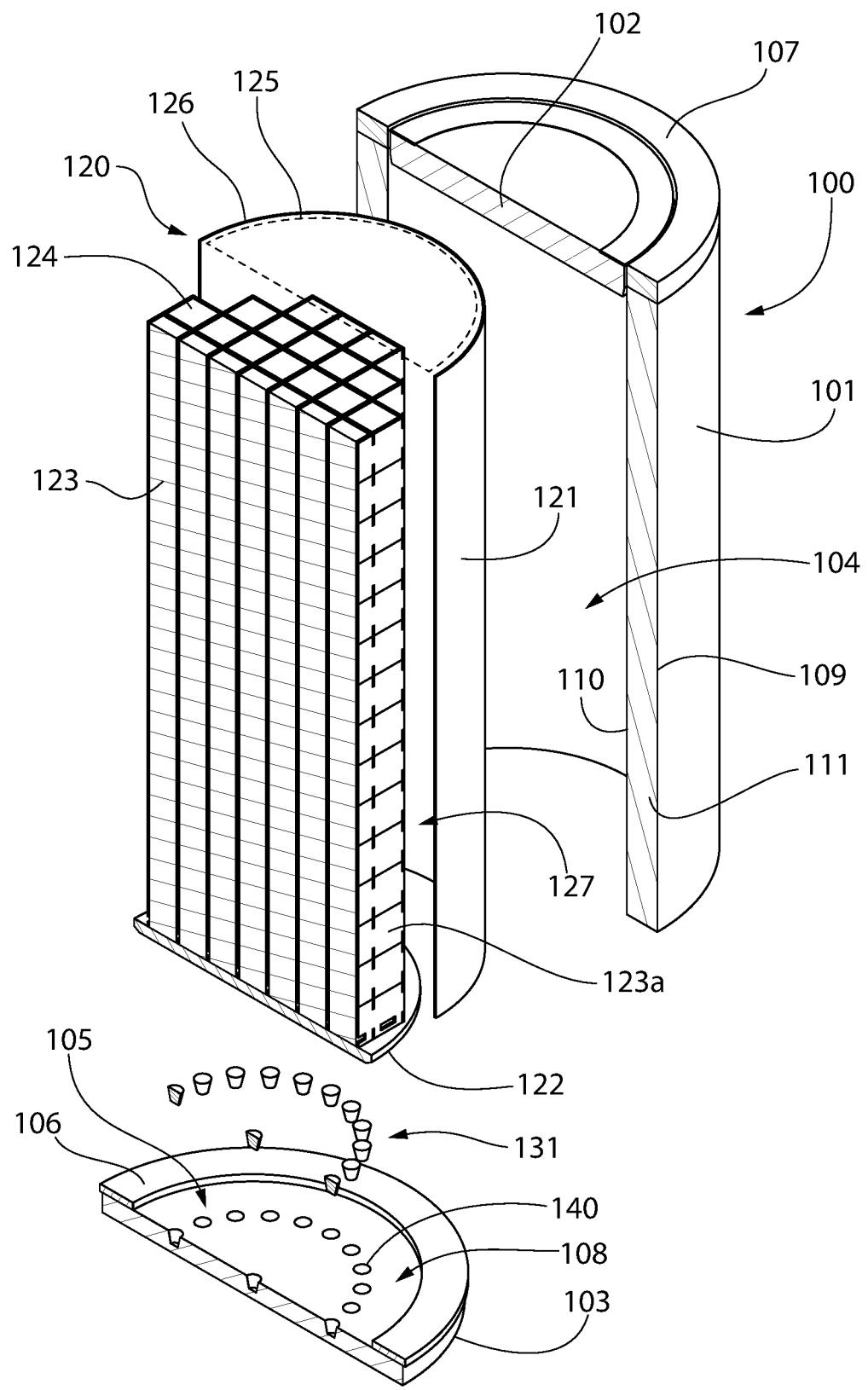
FIG. 3 is an exploded view thereof.
Figure 4A:
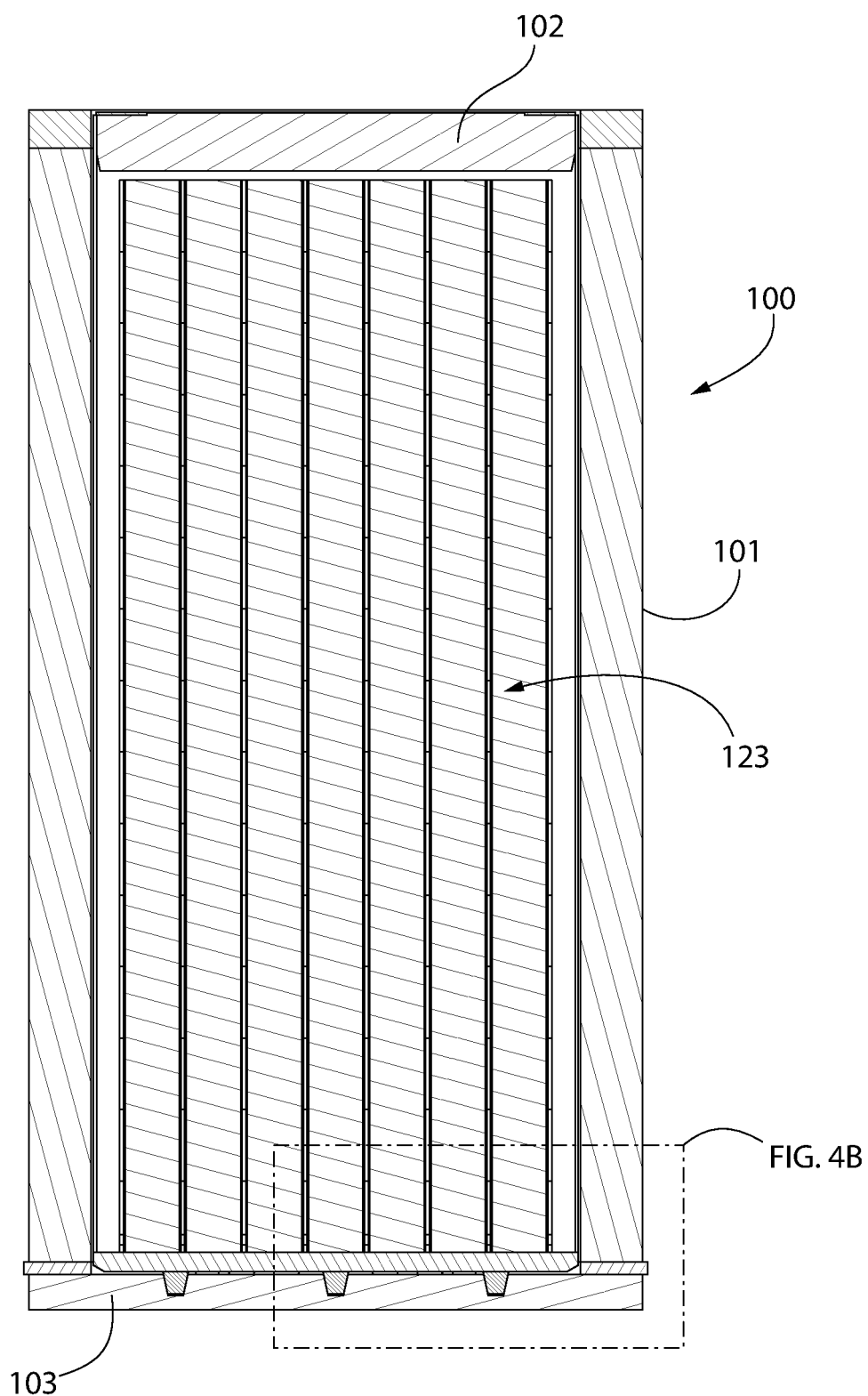
FIG. 4A is a front elevation view thereof.
Figure 4B:
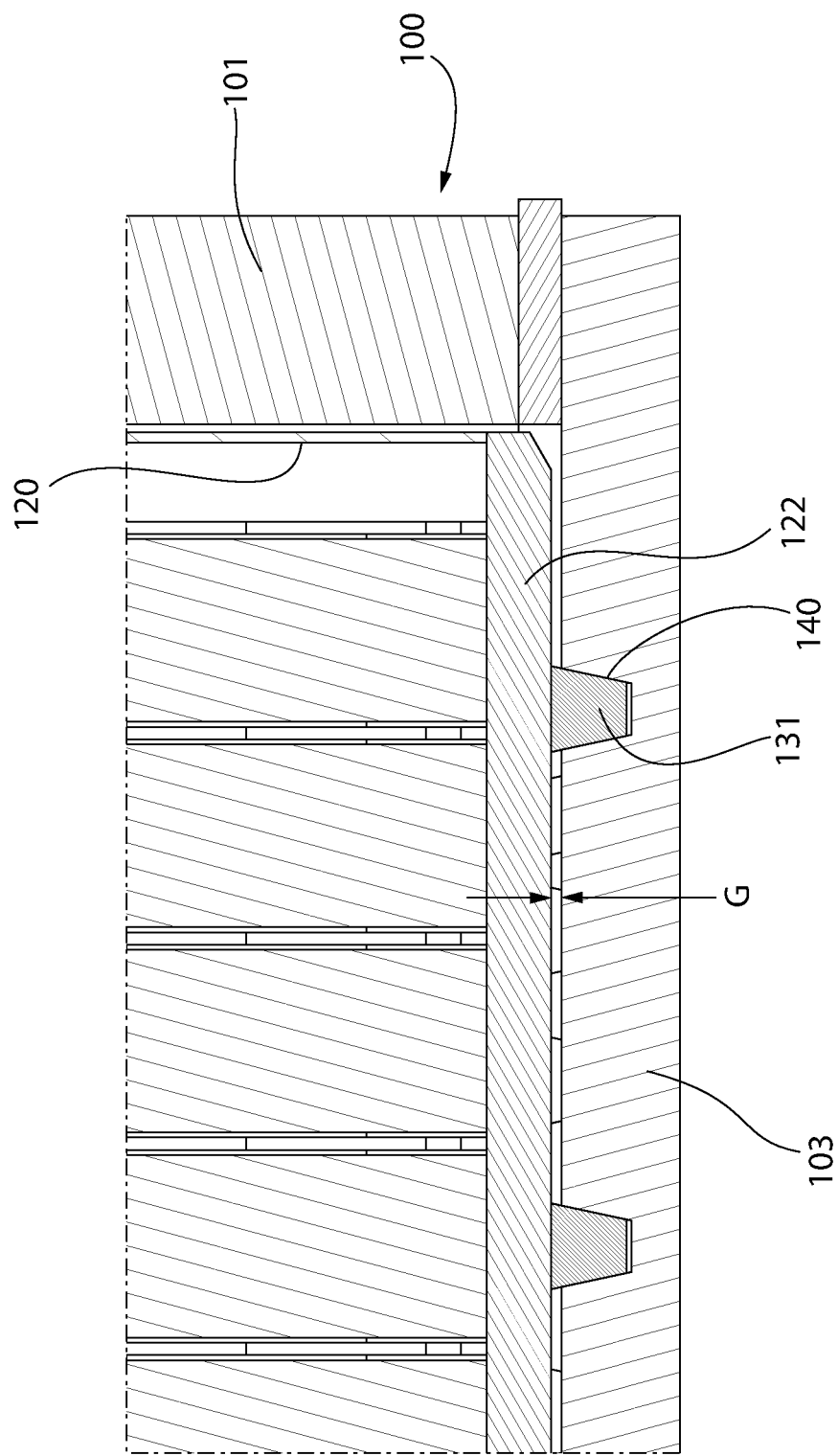
FIG. 4B is a detail taken from FIG. 4A.
Figure 5:
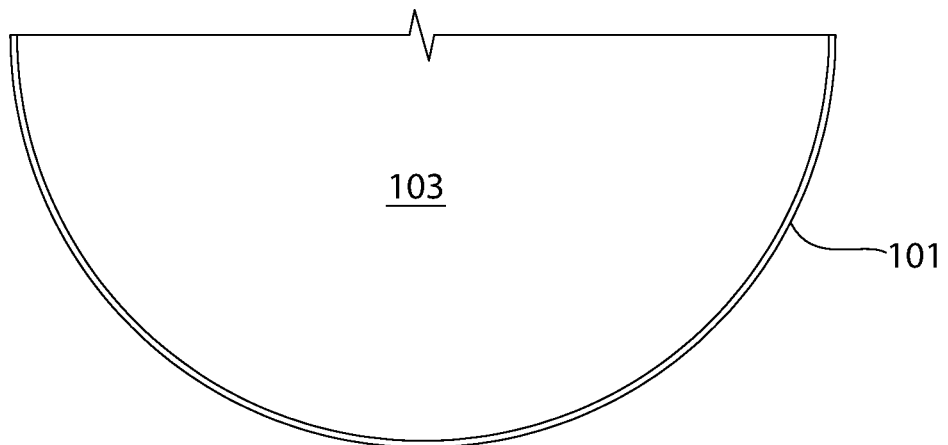
FIG. 5 is a partial bottom view of the cask.
Figure 6:
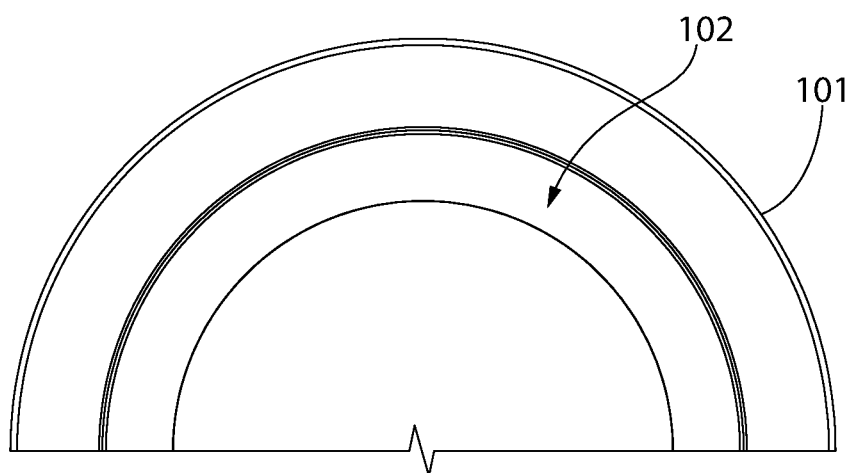
FIG. 6 is a partial top view of the cask.
Figure 7:
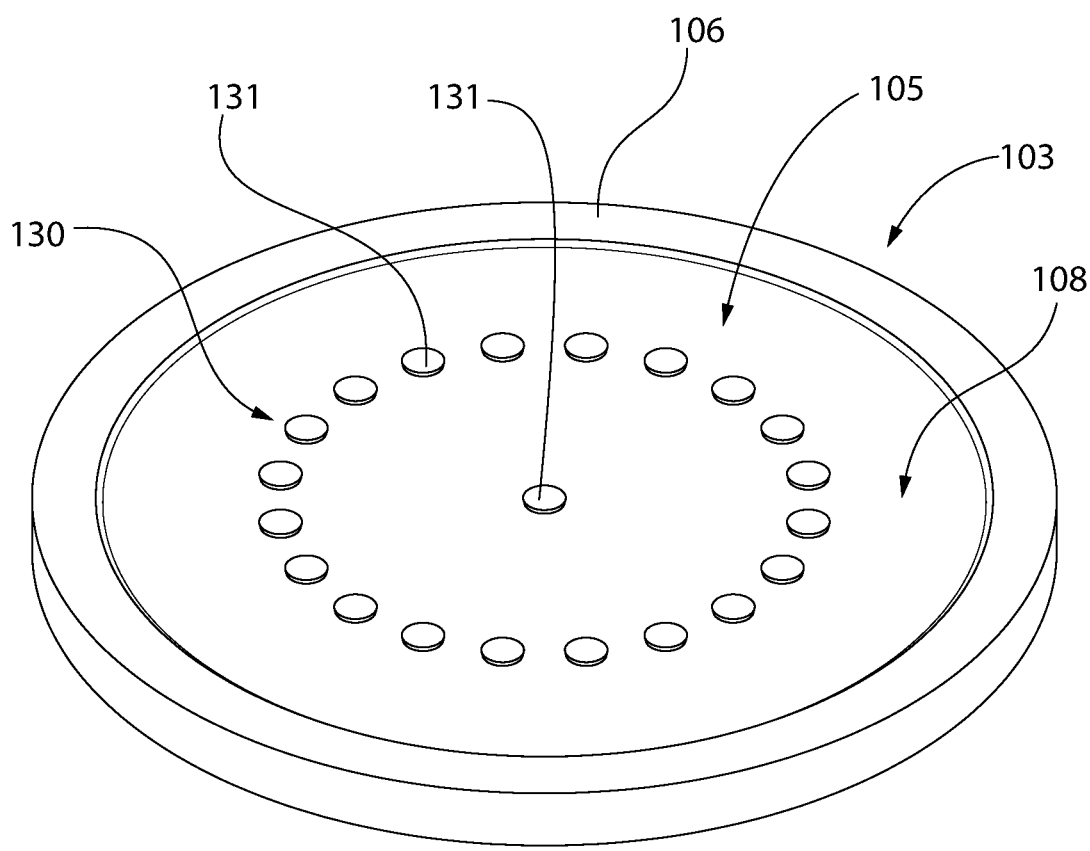
FIG. 7 is a top perspective view of the bottom closure plate of the cask.
Figure 8:
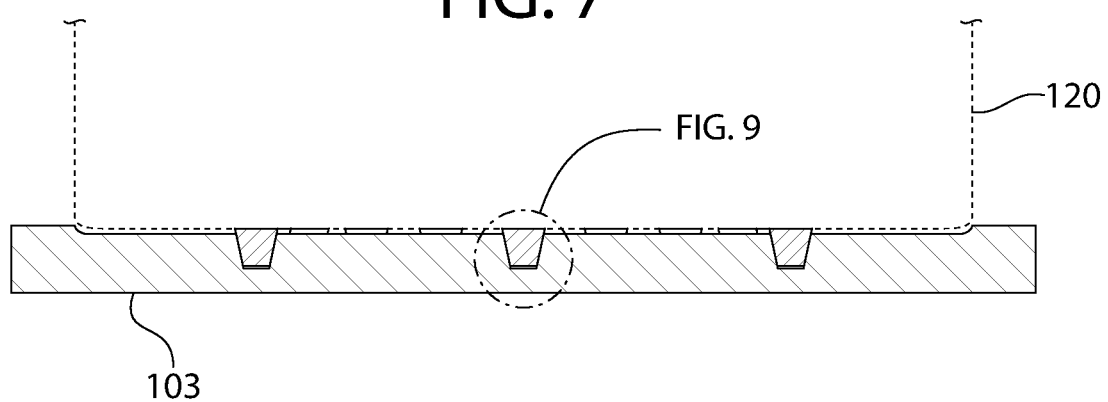
FIG. 8 is a side cross-sectional view of the bottom closure plate.

The circular bottom closure plate 103 of cask 100 may be considered somewhat cup-shaped in one embodiment in view of the raised bottom ring plate 105 which rises up a short distance above the horizontal flat top surface 105 of the bottom closure plate. This construction defines a recessed canister seating area 108 which helps center and stabilize the canister 120 when loaded into the cask. The bottom baseplate 122 of canister 120 is at least partially received in the recessed canister seating area as shown in FIGS. 1 and 2.

The cask 100 is a heavy radiation shielded storage vessel. The cylindrical shell 101 of cask 100 forms a sidewall which may have a composite construction including an outer shell member 109, inner shell member 110, and radiation shielding material(s) 111 disposed between the shell members. In some embodiments, the shielding material 110 may comprise concrete, lead, boron-containing materials, or a combination of these or other materials effective to block and/or attenuate gamma and neutron radiation emitted by the nuclear waste (e.g. fuel assemblies) stored in canister 120 when loaded into the cask 100. Any suitable types, thicknesses, and arrangement of shielding materials may be used to provide the necessary degree of shielding.

The outer and inner shell members 109, 110 of the cylindrical shell 101 of cask 100 may be formed of a suitable metal such as steel. The top and bottom closure plates 102, 103, and the top and bottom ring plates 107, 106 may similarly be formed of metal such as steel.

In conventional cask construction and deployment, the canister is seated directly onto the bottom closure plate of the cask 100 in an abutting relationship. A flat to flat interface is formed between the entirety of the bottom baseplate of the canister and the bottom closure plate of the cask. In the event the cask with canister loaded therein is dropped onto an immovable/stationary hard surface (e.g. top of concrete slab 115 or other relatively hard/compacted material) as shown in FIG. 1, there is no impact protection for the canister which might decrease the g-load or force resulting from the impact force of the cask striking the surface. The kinetic energy of the resultant impact force generated by the drop is transmitted through the bottom closure plate of the cask directly to the baseplate of the canister and then to fuel assemblies therein, which typically rest directly on the baseplate. The structural integrity of the nuclear fuel assemblies and SNF therein are therefore exposed to damage due to the unmitigated g-load or forces resulting from the drop event.

The present disclosure provides an impact amelioration or limiting system configured to absorb and minimize the actual g-load/force transmitted through the cask 100 during a drop event to protect the fuel canister 120. With continuing general reference to FIGS. 1-13, the amelioration system may comprise a plurality of impact limiter assemblies arranged at the lower canister to cask interface (i.e. bottom of canister baseplate 122 to top of cask bottom closure plate 103).

In one embodiment with specific initial reference to FIGS. 1-9C, the impact limiter assemblies 130 each comprise an impact limiter rod or plug 130 and a corresponding plug hole 140. Plug holes 140 may be complementary configured to the plugs 131 in shape/profile. In one embodiment, the sides of the plugs and plug holes may each be tapered. In one embodiment, the plugs 131 may have a frustoconical shape and at least a portion of the plug holes 140 may have a complementary frustoconical shape. In the embodiment shown in FIGS. 9A-C, the entire plug hole 140 is frustoconical in shape from top to bottom.

The impact limiter plugs 131 may comprise a solid body including a top surface 132, bottom surface 133, and sides 134 extending therebetween. The top surface may be flat and larger in surface area than the bottom surface defining an overall wedge-shaped plug. The bottom surface 133 may also be flat as shown and parallel to the top surface 132. Accordingly, sides 133 may be tapered having an angle of taper A1 which defines a plug body having a frustoconical shape as shown.

Plug holes 140 may be complementary configured to the plugs 131. Plug holes 140 comprise an open top 141 configured for at least partially receiving and embedding the plugs 131 therein, a flat closed bottom 142 formed by the cask bottom closure plate 103, and tapered sidewalls 143 extending therebetween. The open top may have larger projected open area than the closed bottom defined by bottom surface 144 of the plug hole defining a wedge-shaped hole. Accordingly, sidewalls 143 of plug hole 140 may be tapered having an angle of taper A2 which defines a plug hole having a frustoconical shape as shown. In certain embodiments, angle of taper A2 of the plug holes 140 may be the same as the angle of taper A1 of the impact limiter plugs 131. The plugs however may be have a maximum diameter D1 defined by the top surface 132 which is slightly larger than the diameter D2 of the open top 141 of plug holes 140 such that the plugs cannot fully enter the plug holes and contact their bottom surfaces 144 (see, e.g. FIG. 9B in the pre-impact embedment position of the plugs in the holes). The slight oversizing of the plugs 131 and mating tapers of the plugs and their associated plug holes 140 create frictional engagement therebetween the mutually engaged plug sides 134 and plug hole sidewalls which retains the plugs in position spaced vertically above from the bottom surface 144 of the plug holes. The bottom surface 133 of plugs 131 may also be larger in diameter than the bottom surface 142 of the plug holes 140. Accordingly, the slightly larger diameter plugs 131 are prevented from slipping completely into the plug holes 140 to the bottom even though the angle of tapers A1, A2 may be the same for each feature (see, e.g. FIG. 9B pre-impact frictionally engaged position of plugs).

In certain exemplary embodiments, the angles of taper A1 and A2 of the plugs 131 and plug holes 140 respectively may be between 30 and 90 degrees, and more preferably between 60 and 90 degrees. The angles of taper A1 and A2 may be about 82 degrees (+/−3 degrees to account for fabrication tolerances) as one non-limiting example. Other suitable taper angles may be used.

When the impact limiter plugs 131 are securely embedded in and frictionally engaged with the plug holes 140 such that the plugs are retained and cannot easily be removed by hand (see, e.g. FIG. 9B), the upper portions of the plugs protrude upward above the top surface 105 of the cask bottom closure plate 103 as shown. Top surfaces 132 of the plugs 131 are therefore elevated above the closure plate 103 forming plateaus or pedestals which collectively act as a seating surface to engage and support the bottom baseplate 122 of the canister 120 in a raised manner elevated above the top surface of the bottom closure plate. When the canister is positioned on the plugs 131, the canister is therefore spaced apart from the bottom closure plate 103 (i.e. top surface 105 thereof) by a vertical space or gap G (see, e.g. FIG. 4B). The gap G advantageously provides a buffer or cushion zone allowing the canister to gradually move downwards in the cask 100 as the plugs 131 elastoplastically deform while moving deeper into the plug holes under the kinetic impact forces generated by the cask striking a hard surface during a drop event (see, e.g. FIG. 1). The impact limiter plugs 131 deform and progress deeper in plug holes 140 due to the resultant impact forces (i.e. canister against the plugs) to decelerate the canister motion and reduce the g-load which protects the canister 120 and fuel assemblies therein. This is demonstrated in the test example described further below.

Figure 9A:
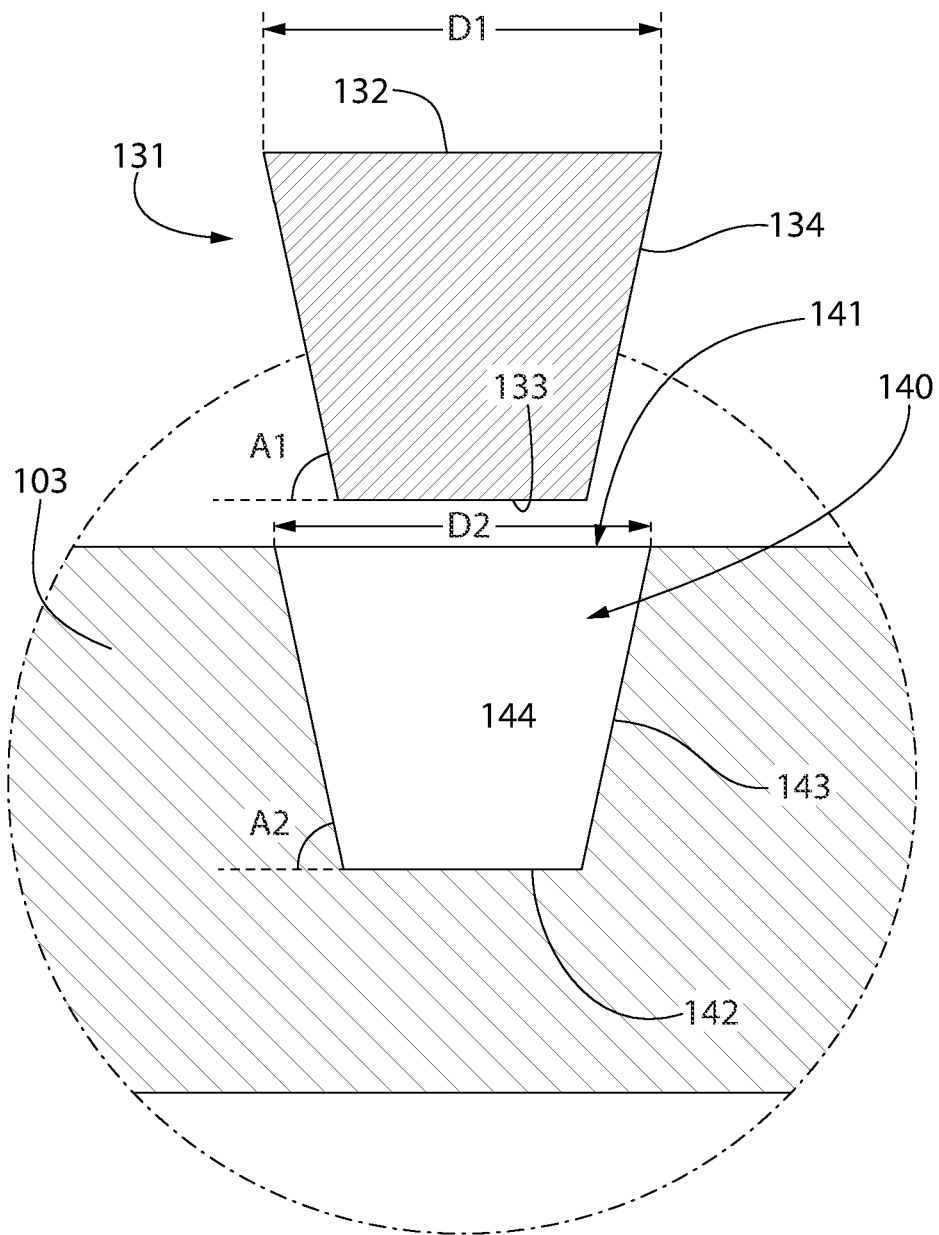
FIG. 9A is a side cross-sectional view showing an impact limiter assembly of the system comprising an impact limiter plug and mating plug hole shown in FIGS. 1-4B.
Figure 9B:
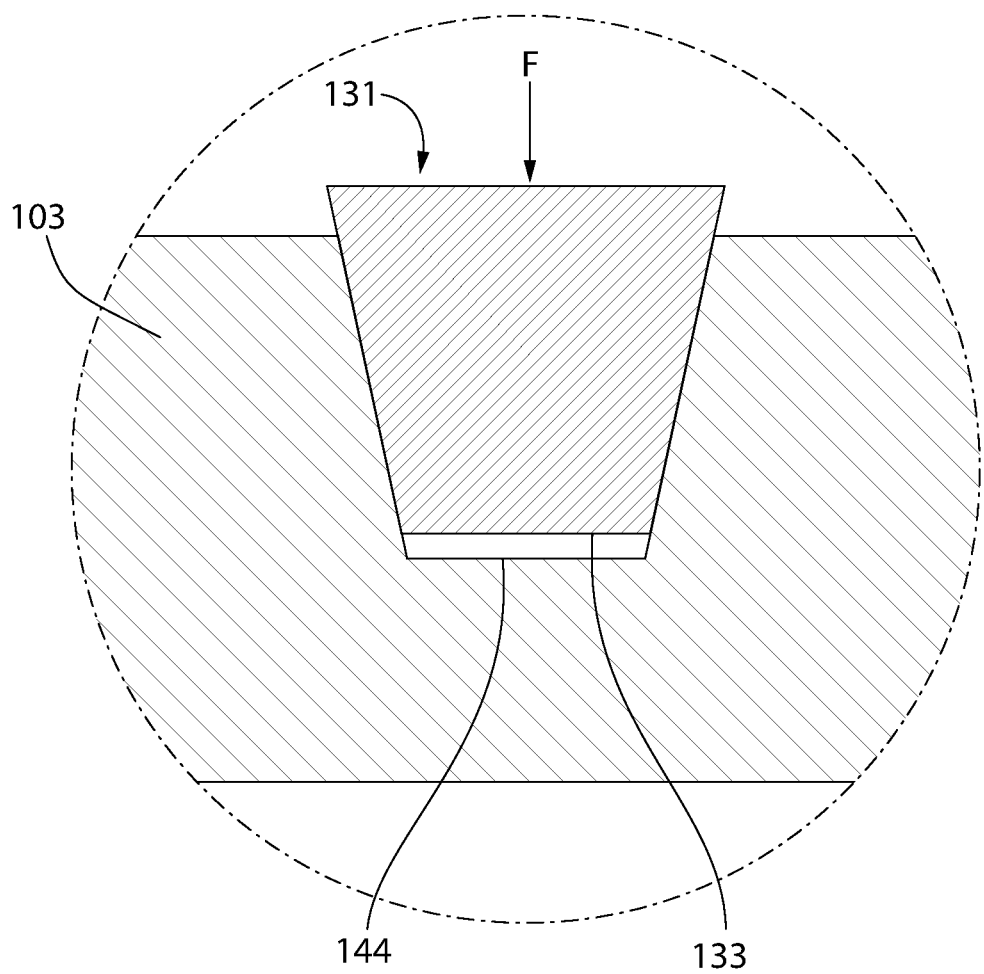
FIG. 9B is a side cross-sectional view thereof showing the plug in an installed pre-impact position.

FIG. 9A shows a single impact limiter plug 131 positioned above and ready for insertion/embedment in its mating plug hole 140. To install the plug, the plug is loosely inserted and then partially driven into the plug hole by a striking device such as a hammer or other device until the plug becomes snuggly fitted in and frictionally engaged with the sidewalls 143 of the hole. This eliminates looseness of the plugs while the canister 120 is loaded into the cask 100. The frictionally and mutually engaged tapers of the sides 134 of plugs 131 and plug hole sidewalls 143 thus retain the fitted plugs in the holes via a friction fit. The plugs therefore are not loosely placed in the plug holes, but rather cannot be removed by hand when properly installed. The plugs are now partially embedded in their respective plug holes as shown in FIG. 9B and ready for service to receive and seat the canister 120 thereon when loaded into the cask 100. In this pre-impact position shown, the bottom surface 133 of plug 131 is spaced vertically apart from the bottom surface 144 of the plug hole 140. This provides space for the plug to move deeper into the plug hole as the plug is forced inwards into the hole as it undergoes elastoplastic deformation due to impact forces generated by the drop event.

Figure 9C:
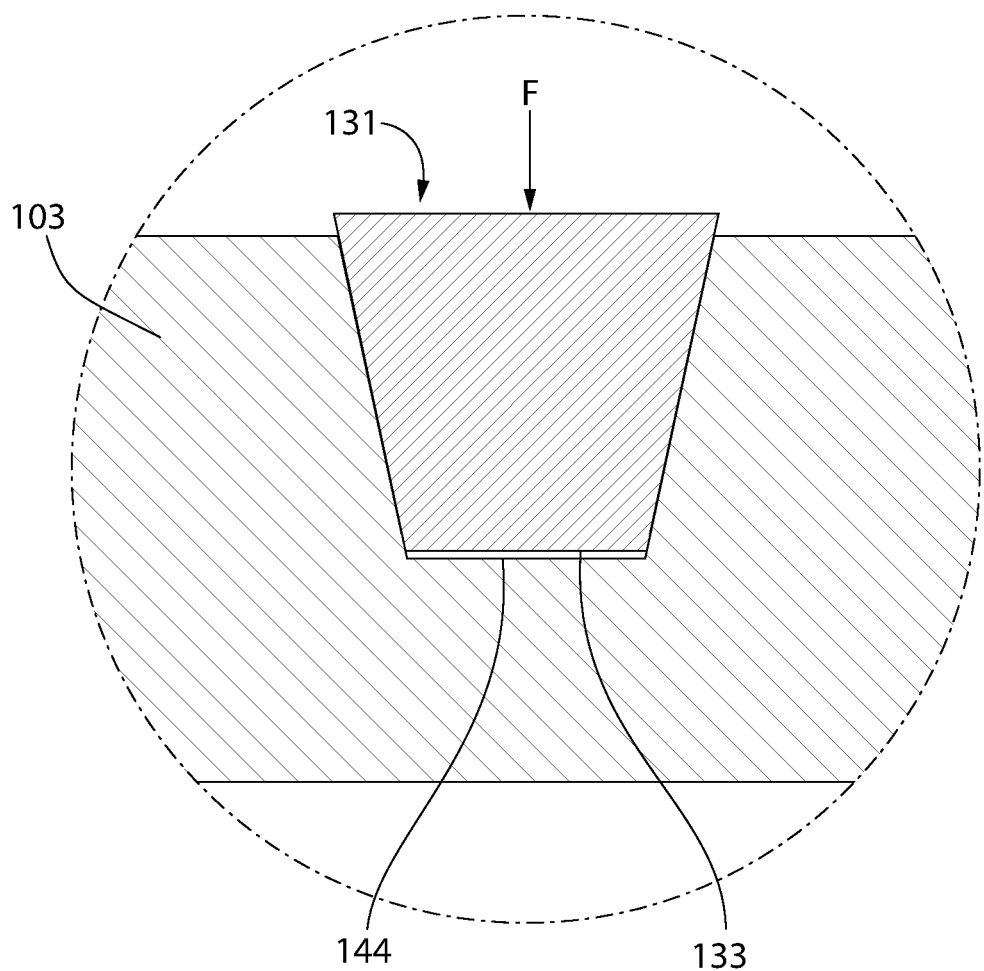
FIG. 9C is a side cross-sectional view thereof showing the plug in a deeper post-impact position in the plug hole after application of an impact force resulting from a cask drop event.

In the occurrence of a cask drop event (see, e.g. FIG. 1), the cask 100 falls vertically for a distance and may strike/impact a hard surface such as that defined by a. concrete pad/slab 115. This accident may occur if the cask rigging or hoist mechanism associated with a track-driven cask crawler, which is commonly used in the industry for lifting/lowering and transporting the cask with fuel canister 120 therein, were to fail. However, other scenarios of dropping the cask, or dropping canister into the cask while loading it therein, are possible as well. The bottom closure plate 103 of the cask is the first containment vessel to impact the immovable hard surface and decelerate to zero acceleration due to gravity. The momentum of the falling canister 120 inside the cask 103 resulting from the drop causes the canister to continue its downward motion momentarily (e.g. fraction of a second) until its movement is in turn fully arrested by engagement with the impact limiter plug assemblies 130 on the bottom closure plate 103 of cask 100. The baseplate 122 of the canister 100 may remain engaged with the impact limiter plugs 131 during the fall or may slightly move ajar, depending on the height of the drop and relative weights of the cask and canister (cask typically being heavier due to its thick sidewalls which may include concrete for radiation shielding). In either event, the impact force F (g-load/force) of the canister against the impact limiter plugs 131 illustrated in FIG. 9B causes the plugs to become driven deeper into their respective plug holes 140 by overcoming the interfacial frictionally engagement forces between the sides 134 of the plugs and corresponding hole sidewalls 143 and elastoplastic deformation of the metallic plugs. This deeper second position of the plugs 131 in the holes 140 is shown in FIG. 9C. In this figure, the bottom surfaces 133 of the now more deeply embedded plugs after impact ("post-impact position") are separated from the bottom surface 144 of the plug holes by a lesser distance or space by comparison than the "pre-impact" plug position shown in FIG. 9B. Similarly, the tops of the impact limiter plugs may still protrude upward beyond the top surface 105 of the cask bottom closure plate 103, but also by a lesser amount or distance than pre-impact. In some impact events scenarios and embodiments, the tops of the plugs may be driven completely flush with the top surface of the bottom closure plate.

Due to the impact of the falling cask scenario (drop event), the plugs 131 concomitantly undergo some degree of elastoplastic deformation as they are driven deeper into their respective plug holes 140. In some cases depending on the angles of tapers A1, A2 and sizes used for the plugs and holes, and other parameters such as the metal material selected for the plugs versus the cask bottom closure plate 103, the plugs may possibly contact the bottom surface 144 of the holes depending on the magnitude of the kinetic impact force (which equates to the height of drop). In some instances, the tops of the plugs may possibly deform and mushroom due to the impact force which may reduce the penetration depth of the plugs in the holes. In either case, the deformation and frictional engagement of the plugs 131 with the sidewalls 143 of the plug holes 140 absorbs at least some of the impact force and causes the canister 120 to more gradually decelerate, thereby decreasing the g-load imparted on the canister to better protect the structural integrity of the canister and fuel assemblies stored therein. In sum, under impact, the tapered plugs 131 would advance inside the tapered holes 140 as the kinetic impact energy is dissipated by the combined action of interfacial friction therebetween and the elastic/plastic expansion action or deformation of the plugs in the plug holes.

The principal engineering parameters of the impact amelioration system such as the material selected for the tapered impact limiter plugs 131 in contrast to the cask bottom closure plate 103 which defining the corresponding plug holes 140, angle of taper A1 and A2 of the plugs and holes, plug diameter, and the number and pattern/arrangement of plugs on the bottom closure plate make possible to decrease the peak g-load imparted to the canister 120 during a cask drop event significantly.

In one non-limiting arrangement, a first group or cluster of impact limiter plug assemblies 130 (pairs of tapered plugs 131 and mating plug holes 140) may be arranged in a circular array on the bottom closure plate 103 of the cask 100 (see, e.g. FIGS. 3-4 and 7-8). The plug assemblies are circumferentially spaced apart as shown. Depending on the diameter D1 of the plugs 131, additional circular arrays may be added inside and/or outside of the array shown. In some embodiments, one or more a center plug assemblies 130 may be located centrally with respect to and inside of the circular array. A single plug assembly located at and intersecting the vertical centerline Vc of the canister may be provided in some embodiments. In other embodiments, a cluster of center plug assemblies 130 may be provided and arranged in any suitable pattern within the outer circular array of assemblies. The plug assemblies 130 are located within the recessed canister seating area 108 of the cask bottom closure plate 103 inside the raise annular bottom ring plate 106 as shown. This is the area which receives the bottom baseplate 122 of the fuel canister 120.

In other less preferred but possible embodiments contemplated, the arrangement of the plug assemblies 130 may be reversed to that shown. Accordingly, the plug holes 140 may be downward facing openings formed in the base plate 122 of canister 120 provided if the base plate is sufficiently thick. The tapered the plugs 131 may be embedded in the holes and protrude downwards from the base plate to engage the top surface of the cask bottom closure plate 103 when the canister is loaded therein.

Test Example

To demonstrate the impact amelioration system concept, the case of a falling transfer cask 100 containing an MPC (canister 120) is considered with reference to FIG. 1. The transfer cask is assumed to fall from a height of 6.56 feet in this postulated scenario onto a reinforced concrete pad or slab 115. The following data characterizes the physical/mechanical parameters of the computer simulated drop test: weight of transfer cask 100 body: 120,000 pounds; weight of the loaded MPC 120: 90,000 pounds; MPC diameter 75¾ inches; thickness of the transfer cask baseplate 103: 5½ inches; Material of impact limiter rod or plug: ASME/ASTM SA479 stainless steel; Material of cask bottom closure plate 103: ASME/ASTM SA516 Grade 70.

Calculations using LS-DYNA (a state-of-the-art impact dynamics code widely used in the industry) showed the peak deceleration of the MPC to be 262 g's when the transfer cask is dropped with the MPC resting directly onto the transfer cask baseplate without impact limiter assemblies 130. Next, using the present impact amelioration system disclosed herein, the cask's bottom closure plate 103 was equipped with 16 circumferentially arranged impact limiting plugs 131 of 4-inch diameter (D1) and 82 degree included angle of taper (A1) each situated in frustoconical plug holes 140 also with 82 degree included angle of taper (A2). An equal sized impactor at the centerline Vc of the MPC 120 was also employed. When this second configuration with impact limiter assemblies 130 was employed, the peak deceleration of the MPC dropped down to 180 g's. The impact limiter plugs 131 were driven into and advanced in the holes by only 0.13 inch to achieve this substantial reduction in g-load. Therefore, by reducing the angle of taper in other configurations, the penetration of the plugs 131 into the plug holes 140 can be further increased, and the g-load correspondingly reduced further. Accordingly, the foregoing analysis demonstrates the benefits of present impact amelioration system for reducing the g-load on the canister and protecting the canister and fuel assemblies stored therein.

Figure 10:
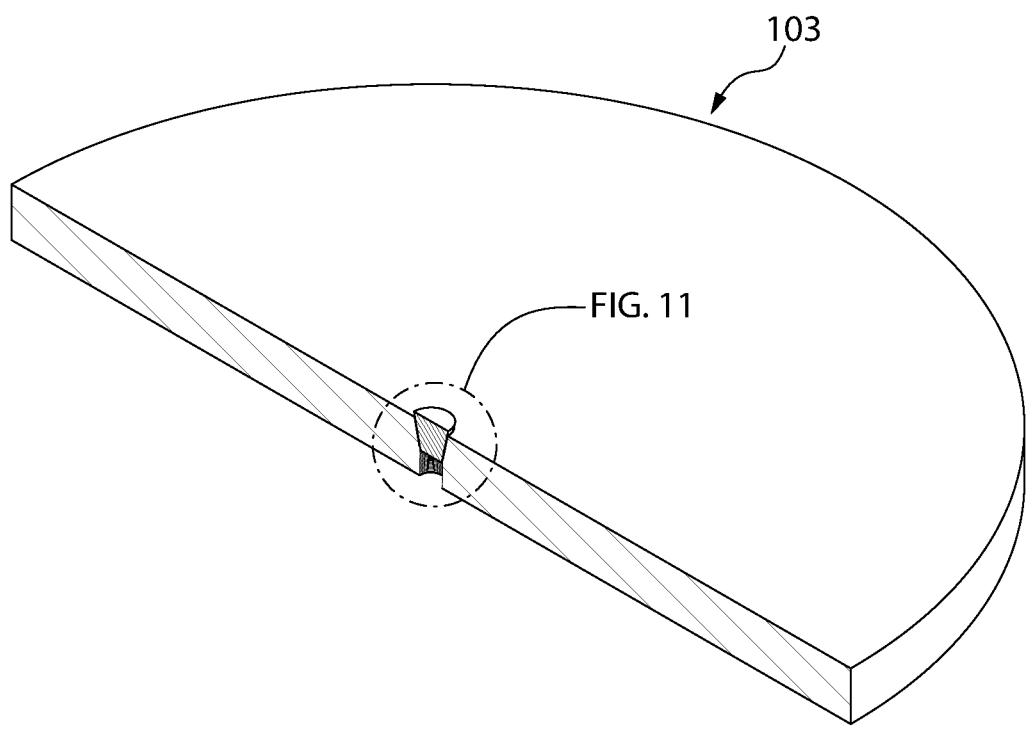
FIG. 10 is a cross-sectional perspective view of the cask bottom closure plate showing a second embodiment of a impact limiter assembly.
Figure 11:
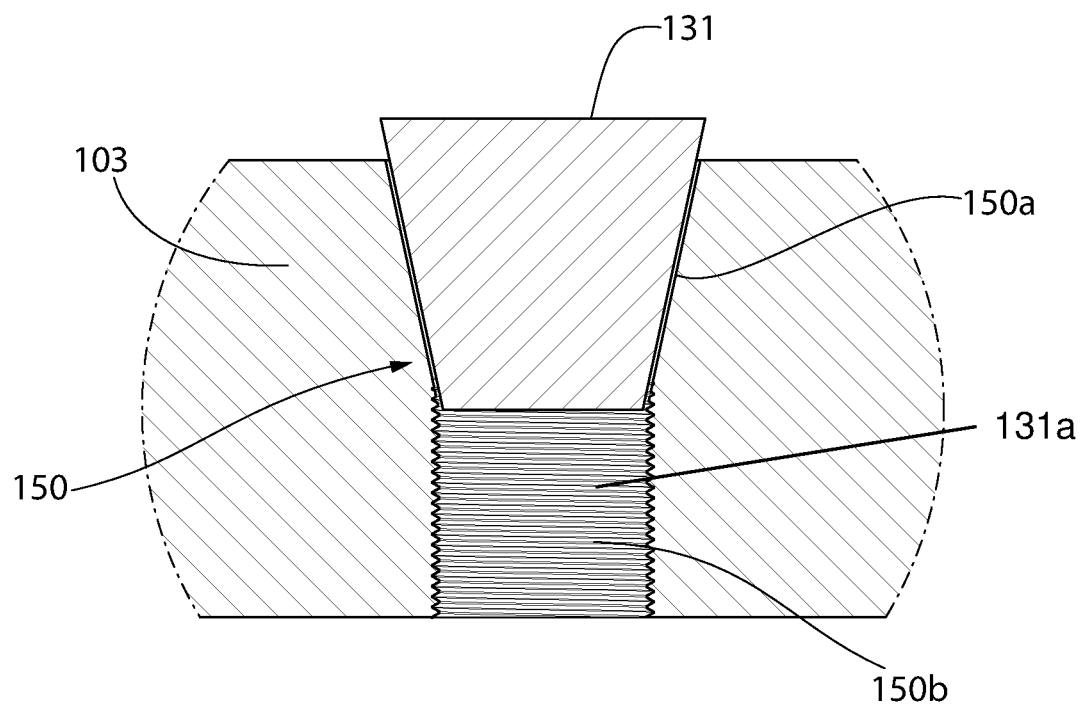
FIG. 11 is a detail taken from FIG. 10.

FIGS. 10 and 11 show an alternate embodiment of an impact limiter assembly. In this embodiment, the plug hole 150 includes an upper tapered portion 150a similar to that previous described herein which is frustoconical shaped. The adjoining lower portion 150b of the plug holes 150 comprises sacrificial threads configured to deform under shear forces imparted by the plugs 131 when the plugs are driven deeper into the plug holes under impact during a cask drop event. The plugs 131 have a mating threaded bottom extension 131a engaged with the threaded hole. Shearing of the threads as the plug 131 is driven deeper into the plug hole 150 after a cask drop event serves to extract impact energy from the fall. The deformation of sacrificial threads in conjunction with the frictional forces acting between the plug and hole sidewalls mutually contribute and act in unison to absorb the g-forces acting on the canister 100 during the drop event. The threaded lower portion 150b of the plug holes 150 may extend complete through the bottom surface of the cask bottom closure plate 103, or in other embodiments may have a closes bottom which does not penetrate the bottom surface of the closure plate. Either embodiment may be used. It bears noting that the threaded impact limiter plugs 131 also facilitate installation of the plugs by simply rotating the plugs to threadably engage the threaded plug holes 150, thereby retaining the plugs until the canister 120 is loaded into the transfer cask 100.

Figure 12:
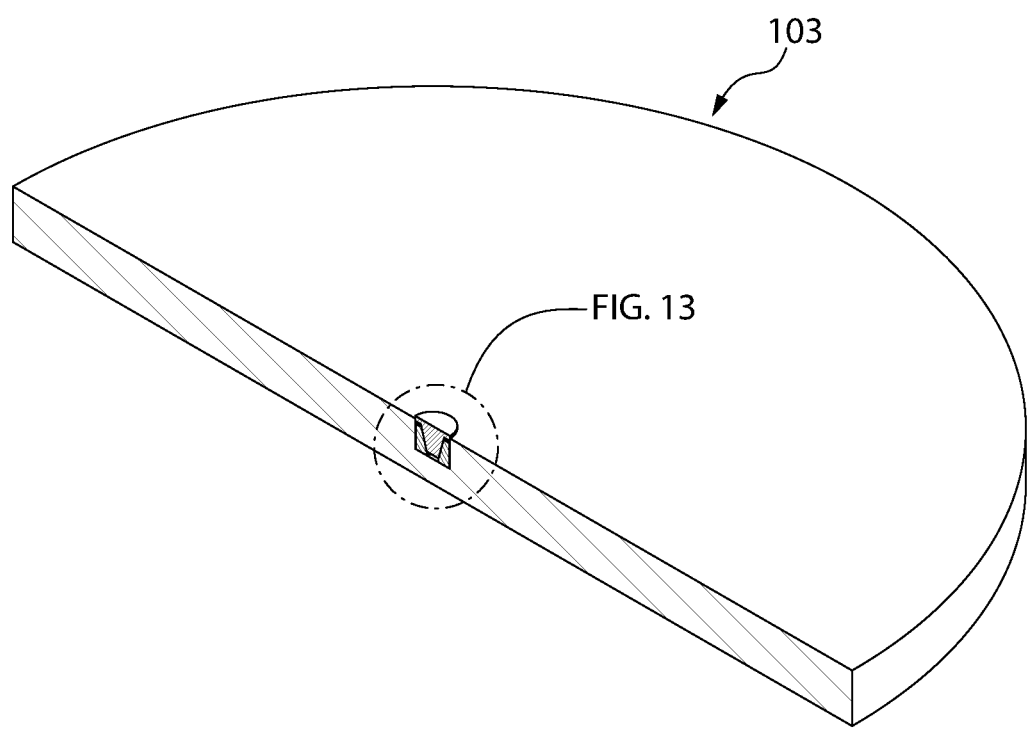
FIG. 12 is a cross-sectional perspective view of the cask bottom closure plate showing a third embodiment of the impact limiter assembly.
Figure 13:
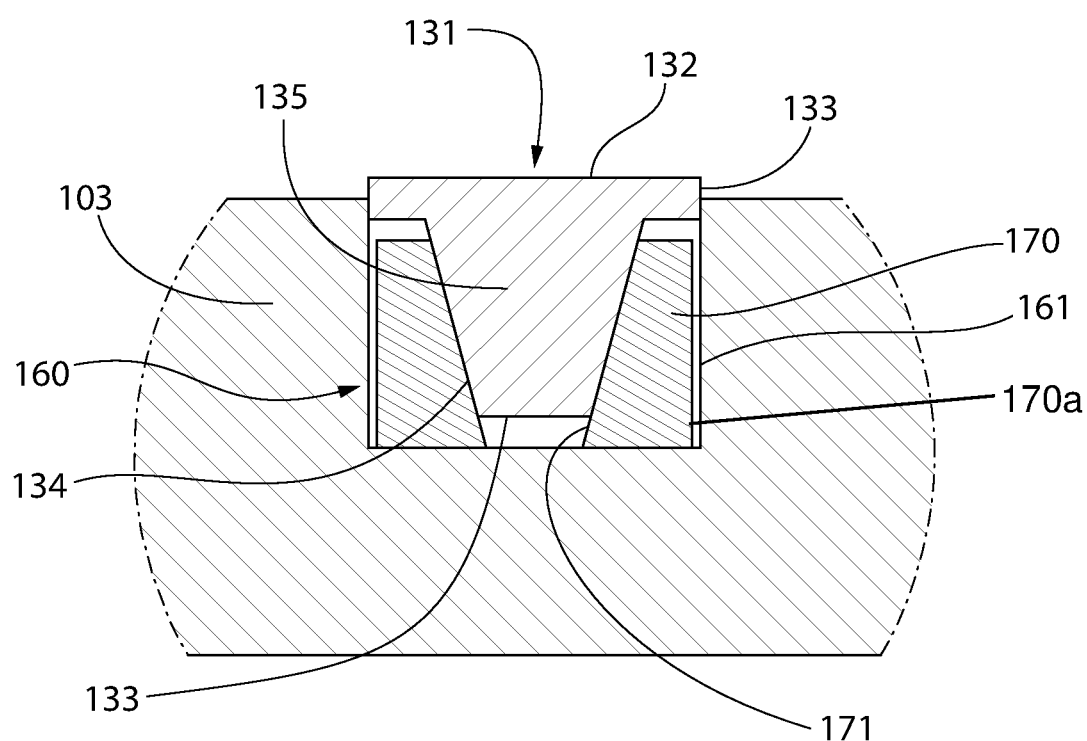
FIG. 13 is a detail taken from FIG. 12.

FIGS. 12 and 13 show yet another embodiment of an impact limiter assembly. In this embodiment, the plug hole 160 has straight sidewalls 161 and a closed bottom. An annular expansion ring 170 is seated in plug hole 160. Expansion ring 170 includes straight exterior sides 170a and a vertical tapered central opening 171 of frustoconical shape which may extend completely through the ring as shown. The opening 171 defines corresponding frustoconical walls which may be complementary configured in angle of taper to the angle of taper A1 of the plug 131. The top surface of the expansion ring 170 may be recessed within in plug hole 160 below the top surface 105 of the cask bottom closure plate 103 as shown.

In this present embodiment of FIGS. 12 and 13, impact limiter plug 131 retains a frustoconical shaped central portion 135 but adds a radially protruding peripheral flange 133 at the top of the plug as shown. The plug with flange may have a diameter measured at its top surface (similar to diameter D1) which in this case is smaller than the top opening of the plug hole 160 such that the flange can at least enter the plug hole 160 as shown. The central portion 135 of plug 131 still frictionally engages the central opening 171 of the expansion ring 170 to retain the plug in place in the pre-impact position shown. Preferably, the expansion ring 170 is sized in outer diameter so that a small annular space is formed between the sides of the ring and the sidewalls 161 of plug hole 160. This provides room for the ring 170 to expand under impact forces after a cask drop event.

In operation after the cask 100 is dropped, the impact limiter plug 131 is driven deeper into tapered central opening 171. The impact force F acting on the mating tapered/angled surfaces of the plug and expansion ring 170 within the central opening 171 has a lateral/horizontal force component (in additional to a vertical force component) as well understood by those skilled in the art. The horizontally acting force component deforms and expands the ring radially outwards as it is squeezed between the plug 131 and plug hole 160 to close the annular space between the ring and plug hole 160 sidewalls 161. In some instances, the ring may possibly engage the sidewalls 161 as it radially expands. The expansion ring in combination with mating tapered surfaces of the impact limiter plug 131 and expansion ring 170 act in unison to absorb and reduce the g-load imparted to the canister 120 during the cask drop event. The peripheral flange 133 of plug 131 may completely enter the plug hole 160. FIG. 13 shows the pre-impact position of the plug in the impact limiter assembly. Expansion ring 170 may be formed of any suitable metallic or non-metallic material. Preferably, the ring is formed of a material having greater ductility (i.e. softer) than the plug 131 to facilitate the expansion of the ring. In one embodiment, the expansion ring 170 is formed of metal such as steel or aluminum. In other embodiments, the ring may be formed a non-metallic material such as a dense polymer.

In view of all the foregoing embodiments of an impact amelioration system, the included taper angles of the tapered plugs 131 and plug holes 140, their material of construction and dimensions, number and arrangement/pattern of impact limiter assemblies 130 on the cask bottom closure lid 130, number and type of threads used in the embodiment of FIGS. 10-11, the height/thickness and material of the optional expansion ring 170 used in the embodiment of FIGS. 12-13, and other aspects are among the parameters that can be varied to obtain the optimal energy extraction for a specific impact scenario to protect the canister 120 and its waste fuel contents from severe damage.

The impact limiter plugs 131 can generally advance in the hole primarily by expanding/deforming the plugs in an elastoplastic manner which exceeds the yield stress of the material, and by overcoming the friction at the tapered/angled interface between the plug and mating plug holes. The plugs are therefore preferably formed of a metallic elastoplastic material such as without limitation steel which undergoes elastic and plastic deformation when the load/force exceeds the yield stress of the material. Plastic deformation beyond the yield stress connotes that the plug will retain permanent deformation and not return to its original condition (e.g. shape and dimensions). Depending on the material selected for the cask bottom closure plate 103, the sidewalls of the plug holes may similarly undergo elastic-plastic deformation to absorb some of the kinetic impact energy resulting from a cask drop event.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An impact amelioration system for nuclear fuel storage components comprising:
    a fuel storage canister comprising a first shell extending along a vertical centerline, the canister configured for storing nuclear fuel;
    an outer cask defining a cavity receiving the canister, the cask comprising a second shell and a bottom closure plate attached to the second shell;
    a plurality of impact limiter assemblies disposed on the bottom closure plate at a canister to cask interface, each of the impact limiter assemblies comprising a plug frictionally engaged with a corresponding plug hole formed in the bottom closure plate;
    wherein the plugs engage the canister;
    wherein the plugs are tapered and the plug holes have a corresponding taper.

2. The system according to claim 1, wherein the plugs protrude upwards beyond the bottom closure plate to engage the canister.

3. The system according to claim 2, wherein the canister comprises a baseplate supported by and resting on the plugs which form pedestals.

4. The system according to claim 3, wherein the canister is separated from the bottom closure plate of the cask by a vertical gap.

5. The system according to claim 3, wherein the plugs have a planar top surface which abuttingly engages the baseplate of the canister via a flat-to-flat interface.

6. The system according to claim 1, wherein the plug holes have a closed bottom and open top.

7. The system according to claim 1, wherein an angle of taper of the plugs is equal to an angle of taper of the plug holes.

8. The system according to claim 1, wherein the plugs have a frustoconical shape and at least a portion of the plug holes have a frustoconical shape.

9. The system according to claim 8, wherein the plug holes have a full frustoconical shape from top to bottom.

10. The system according to claim 1, wherein the plugs are configured to be driven deeper into the plug holes when impacted by the canister.

11. The system according to claim 10, wherein the plugs are movable between an upper shallower position with respect to the plug holes when not impacted by the canister, and a lower, deeper position with respect to the plug holes after impact by the canister.

12. The system according to claim 1, wherein the impact limiter assemblies are arranged in a circular array on the bottom closure plate of the cask, the impact limiter assemblies being circumferentially spaced apart.

13. An impact amelioration system for nuclear fuel storage components comprising:
a fuel storage canister comprising a first shell extending along a vertical centerline, the canister configured for storing nuclear fuel;
an outer cask defining a cavity receiving the canister, the cask comprising a second shell and a bottom closure plate attached to the second shell;
a plurality of impact limiter assemblies disposed on the bottom closure plate at a canister to cask interface, each of the impact limiter assemblies comprising a plug frictionally engaged with a corresponding plug hole formed in the bottom closure plate;
wherein the plugs engage the canister;
wherein the impact limiter assemblies are arranged in a circular array on the bottom closure plate of the cask, the impact limiter assemblies being circumferentially spaced apart; and
further comprising at least one center impact limiter assembly located centrally inside the circular array.

14. The system according to claim 1, wherein the plugs are formed of an elastoplastic material which undergoes elastoplastic deformation to dissipate kinetic impact energy and protect the canister from a cask drop event.

15. The system according to claim 14, wherein the plugs are formed of a steel material and the bottom closure plate of the cask is formed of a steel material different than the plugs.

16. The system according to claim 1, wherein the plugs have a frustoconical wedge-shape.

* * * * *